(12) United States Patent
Gottlieb et al.

(10) Patent No.: US 6,664,710 B1
(45) Date of Patent: Dec. 16, 2003

(54) ELECTROMECHANICAL MOTOR

(75) Inventors: Bernhard Gottlieb, Munich (DE); Andreas Kappel, Brunnthal (DE)

(73) Assignee: Siemens Aktiengesellschaft, Münich (DE)

( * ) Notice: Subject to any disclaimer, the term of this patent is extended or adjusted under 35 U.S.C. 154(b) by 0 days.

(21) Appl. No.: 09/703,630

(22) Filed: Nov. 2, 2000

(30) Foreign Application Priority Data

Nov. 3, 1999 (DE) ........................................ 199 52 946

(51) Int. Cl.$^7$ .............................................. H01L 41/08
(52) U.S. Cl. ................................................ 310/323.02
(58) Field of Search ............................ 310/328, 323.02, 310/323.16

(56) References Cited

U.S. PATENT DOCUMENTS

| | | | | |
|---|---|---|---|---|
| 4,613,782 A | * | 9/1986 | Mori et al. ............. | 310/323.02 |
| 4,743,792 A | * | 5/1988 | Ueyama .................... | 310/328 |
| 4,757,223 A | * | 7/1988 | Ueyama ................. | 310/328 X |
| 4,782,262 A | | 11/1988 | Kiyo-Oka | |
| 4,814,660 A | * | 3/1989 | Yamada et al. ............. | 310/328 |
| 4,888,515 A | * | 12/1989 | Tamura ................. | 310/323.02 |
| 4,950,135 A | * | 8/1990 | Tojo et al. .............. | 310/328 X |
| 5,041,753 A | * | 8/1991 | Clark et al. ................. | 310/328 |
| 5,079,471 A | * | 1/1992 | Nygren, Jr. ................. | 310/328 |
| 5,162,692 A | | 11/1992 | Fujimura | |
| 6,066,911 A | * | 5/2000 | Lindemann et al. ... | 310/323.02 |

FOREIGN PATENT DOCUMENTS

| | | |
|---|---|---|
| DE | 43 26 479 | 2/1995 |
| DE | 44 35 996 | 4/1996 |
| DE | PS 195 35 481 | 7/1997 |
| DE | OS 197 46 609 | 3/1999 |
| DE | OS 198 20 514 | 3/1999 |
| WO | WO 97/26702 | 7/1997 |
| WO | WO 97/47078 | 12/1997 |

OTHER PUBLICATIONS

Patent Abstracts of Japan, Publication No. 10337059, Dec. 18, 1998, For Japanese Application No. 10014426.
Patent Abstracts of Japan, Publication No. 03273871, May 12, 1991, For Japanese Application No. 020275039.
Patent Abstracts of Japan, Publication No. 63039478, Feb. 19, 1988, For Japanese Application No. 61182808.
Patent Abstracts of Japan, Publication No. 60156283, Aug. 16, 1985, For Japanese Application No. 59012554.

* cited by examiner

Primary Examiner—Mark Budd
(74) Attorney, Agent, or Firm—Schiff Hardin & Waite

(57) ABSTRACT

An electromechanical motor and method for operating same result in a motor low-wear, quiet, slip-free and simple structure, wherein the drive shaft is driven free of bending moments, can be arrested in quiescent position and can be operated at low speed. A drive ring is disposed for line contact with the shaft and moved by a combination of linear displacements of respective electromechanical drive elements to execute a circulatory motion.

11 Claims, 17 Drawing Sheets

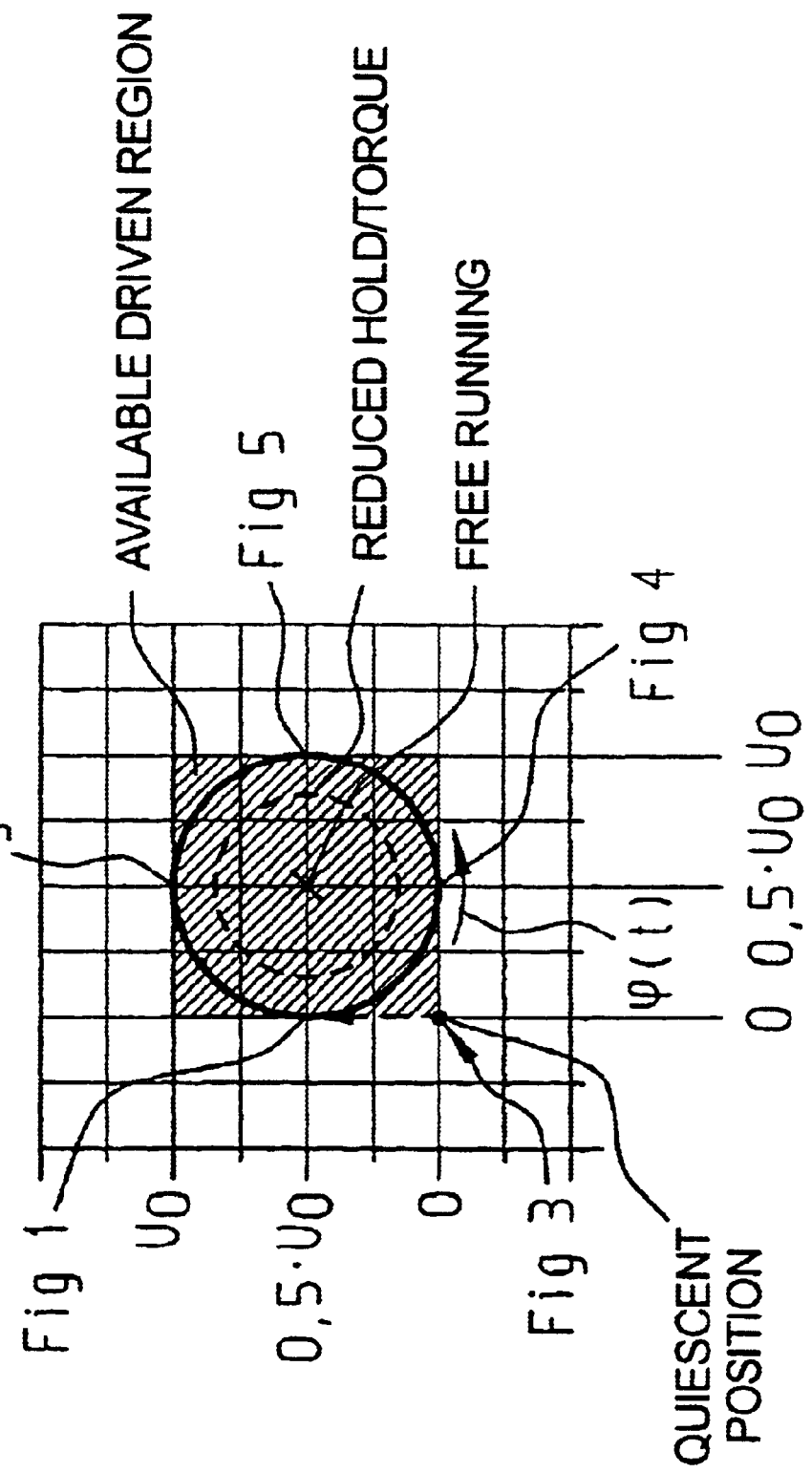

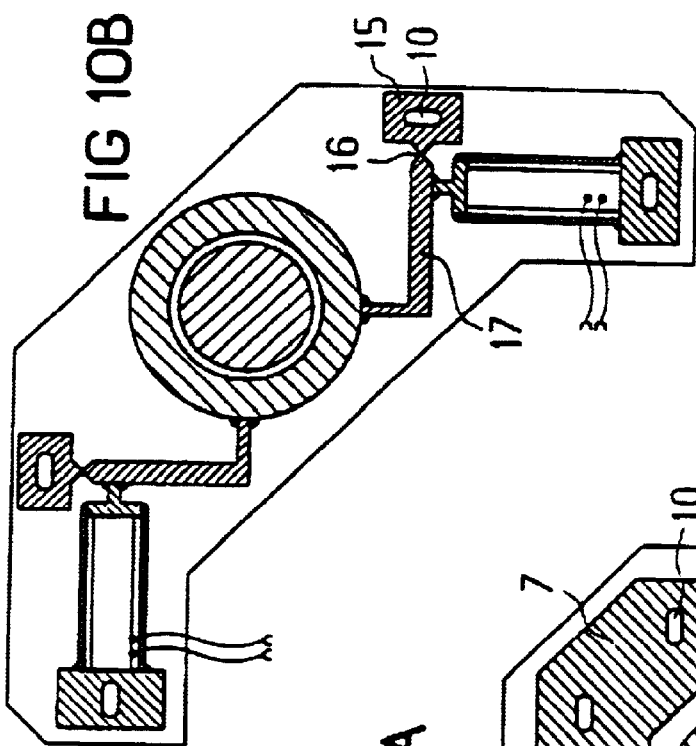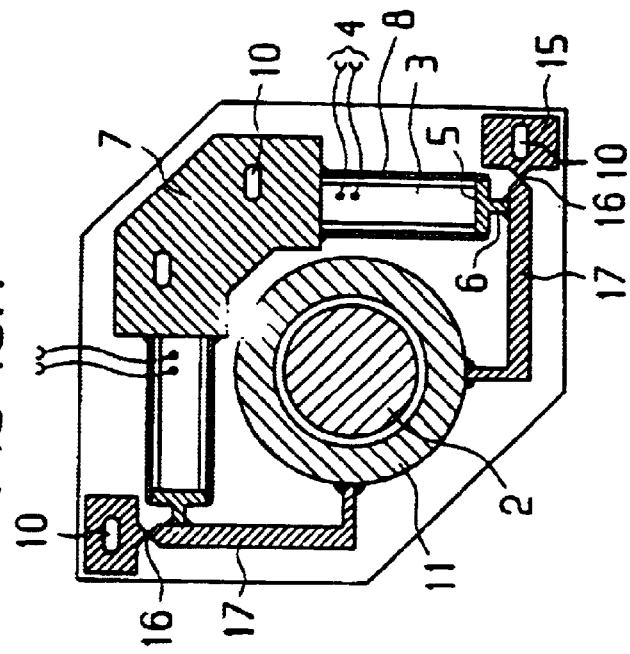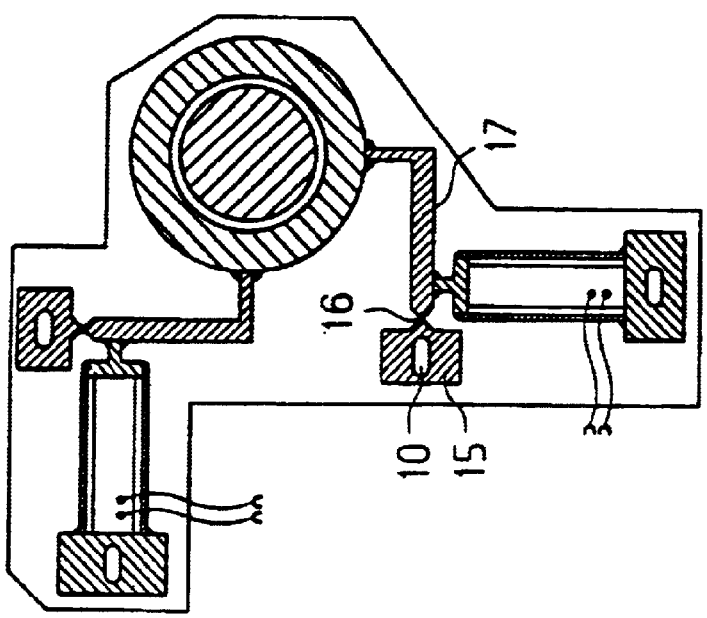

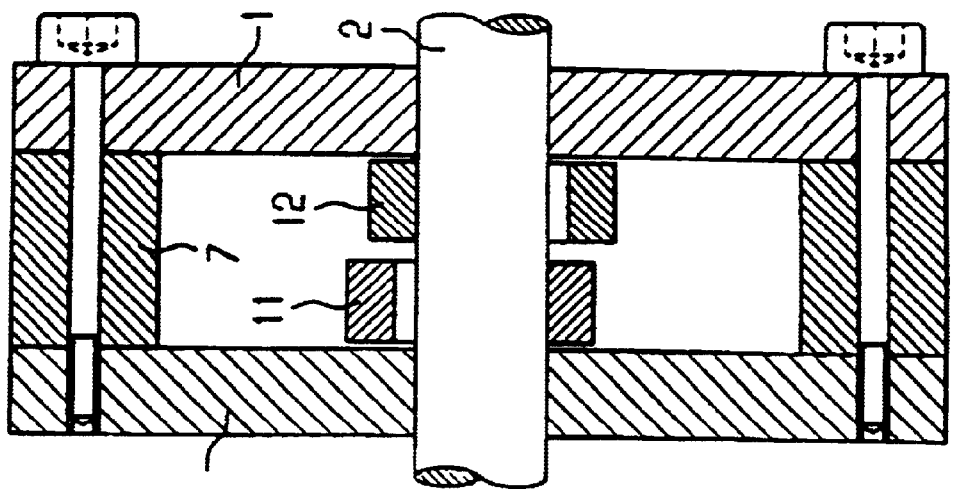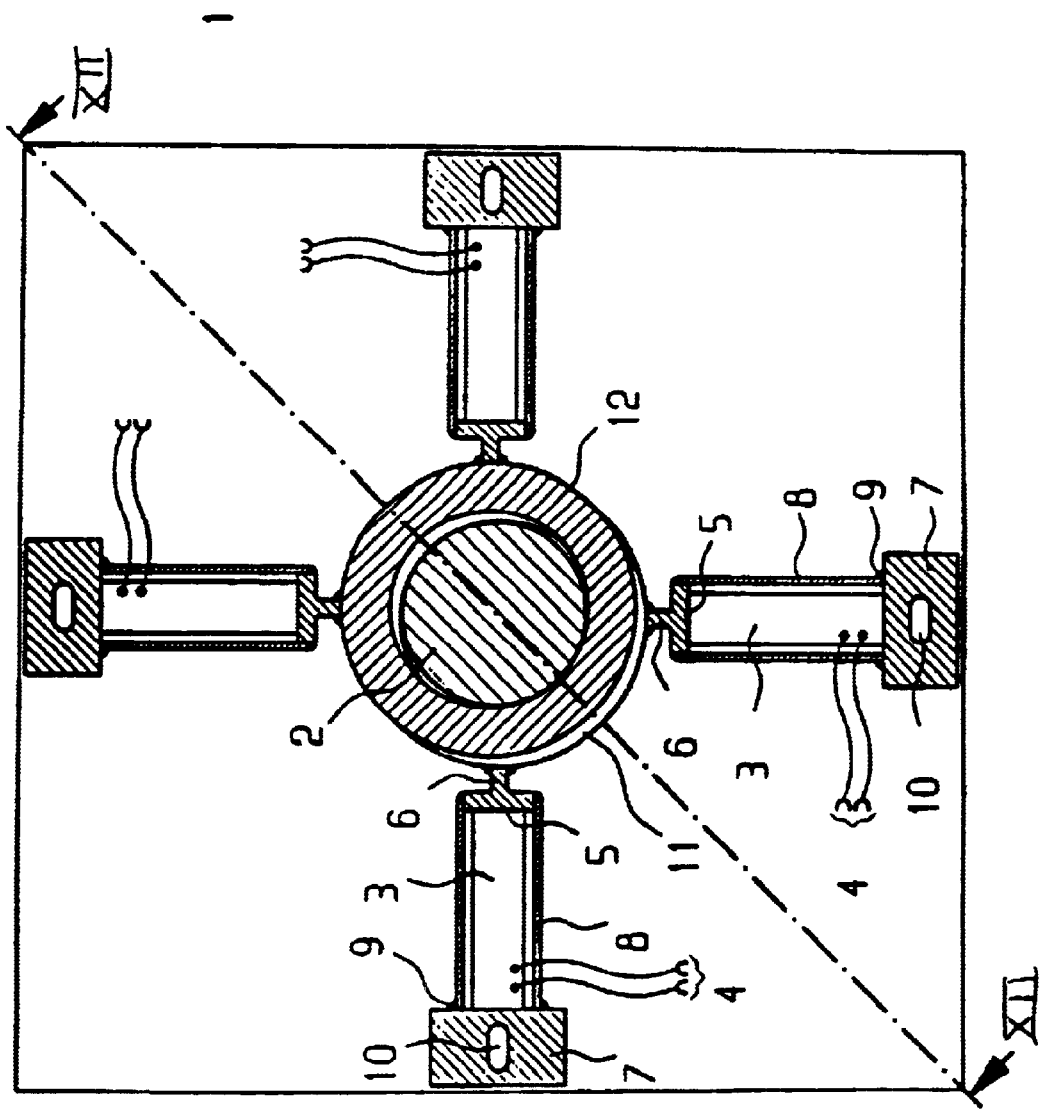

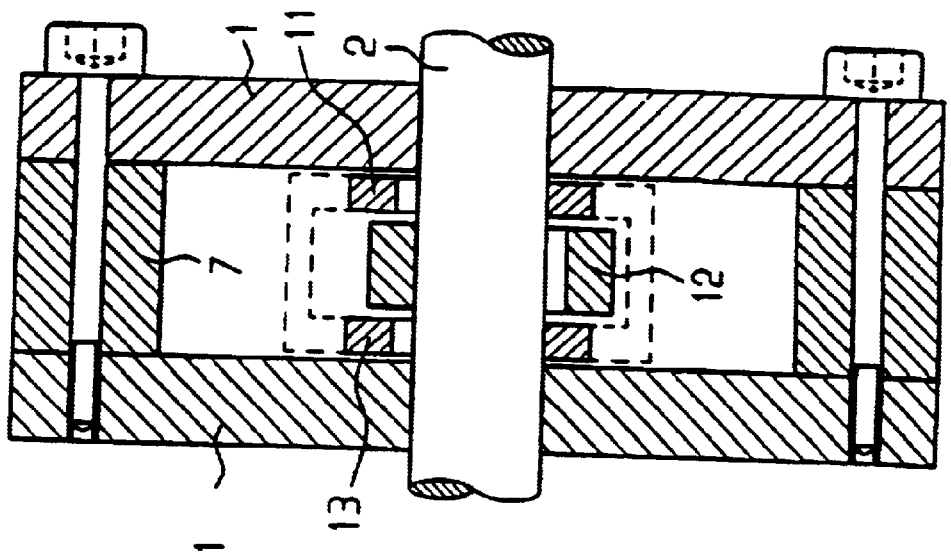
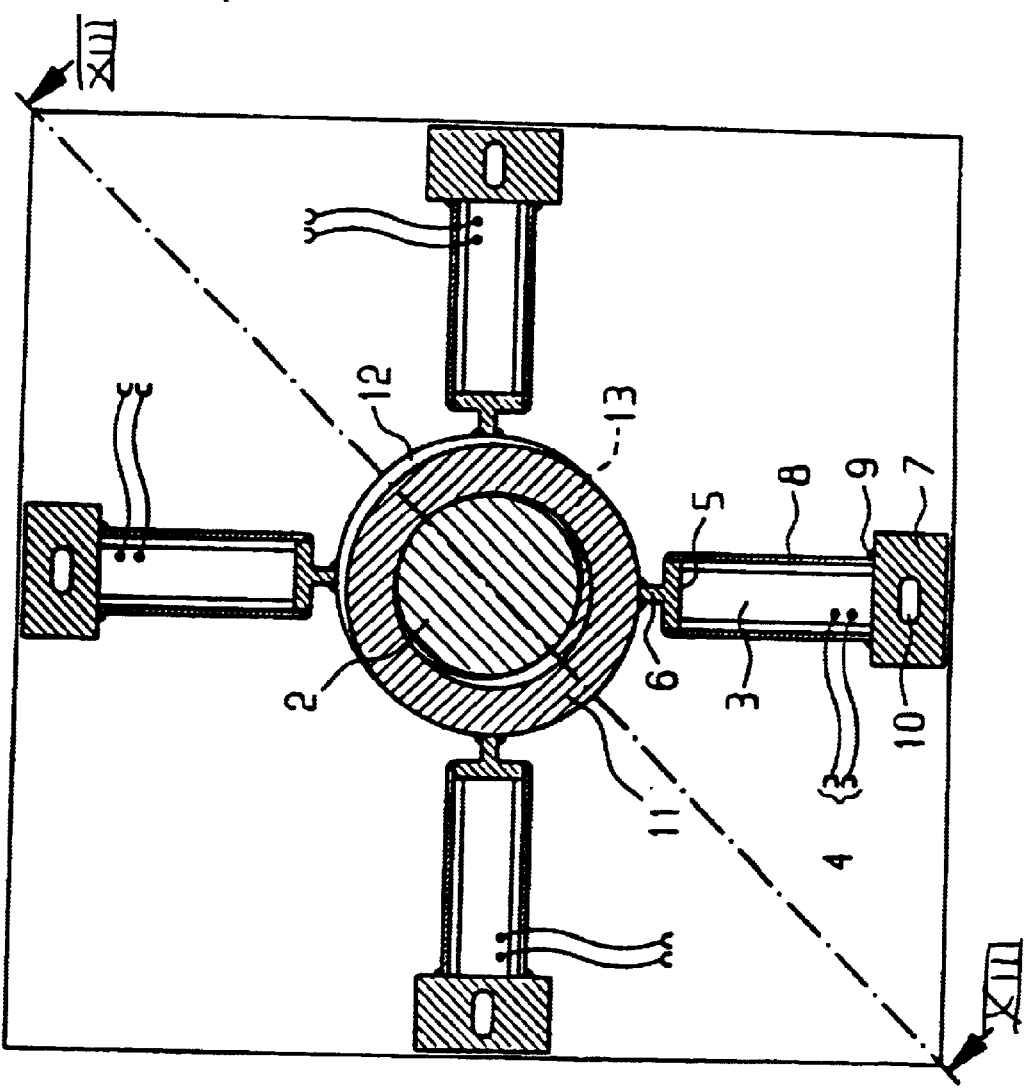

ELECTROMECHANICAL MOTOR

BACKGROUND OF THE INVENTION

1. Field of the Invention

The present invention is directed to an electromechanical motor, a method for the operation thereof.

2. Description of the Prior Art

Piezo motors are known primarily in the form of a traveling wave motors and tappet-driven piezo motors. Whereas the former must always be operated in a resonant mode, the tappet-driven piezo motor can be operated resonantly as well as non-resonantly. As advantages, a piezo motor

- has a high torque because it rotates slowly, so that a translation gearing (transmission) can be eliminated;
- a short acceleration and stopping time in the millisecond range;
- self-inhibition, i.e. that a position of a drive shaft is preserved after turn-off, even given the influence of external forces;
- a low mass, which enables a lightweight structure in, for example, a motor vehicle;
- a small structural volume as a result of the unneeded translation gearing;
- emission of substantially no electromagnetic stray fields;
- a high efficiency; and
- a possibility of load monitoring with the piezo actuator/sensor.

The disadvantages of a piezoelectric traveling wave motor are high wear due to frictional drive, high manufacturing costs due to the required mechanical precision, which must be durably implemented, a lack of scability due to the traveling wave principle thereby limiting it to a comparatively small structural size.

The disadvantages of a tappet-driven piezo motor are high wear due to frictional drive, high noise production due to the impact of a drive tappet on a shaft, high manufacturing costs caused by a high mechanical precision, and slippage, i.e. if external forces act on the shaft, the shaft is moved somewhat back in the phase wherein there is no frictional lock with the drive tappet. In order to avoid slippage, a number of piezoelectrical drive tappets can be provided, so that there is always a frictional lock between at least one of the tappets and the drive shaft. This, however, causes extremely high costs due to the required number of piezo actuators together with appertaining drive electronics.

SUMMARY OF THE INVENTION

An object of the present invention is to provide a wear-resistant, quiet, largely slippage-free and simplified motor.

This object is inventively achieved in an electromechanical motor having at least two electromechanical drive elements, a drive ring on which the drive elements act, and a driveable shaft. The drive ring is caused to perform a circulatory displacement motion as a result of a combination of linear displacements of the respective electromechanical drive elements, i.e. by controlling the linear displacement amplitudes of the individual drive elements and the relative timing of these amplitudes. A circulatory displacement motion of the drive ring means that this element is displaced along a curved path, but does not rotate or rotates only insignificantly. The curved path can, for example, be circular or elliptical but is not limited to these path shapes. The drive ring need not continuously traverse the curved path, but can be arbitrarily stopped and reversed in terms of its motion sense.

The shaft can be placed in the drive ring, or vice versa, so that the displacement motion of the drive ring can be transmitted onto the shaft due to the contact between the shaft and the drive ring. Since the drive ring proceeds on a curved path, the shaft—when the drive ring moves—is entrained in rotary fashion by frictional contact. In addition to being dependent on the rate of motion of the drive ring, the rotational speed of the shaft is also dependent on the shape of the shaft and of the drive ring, among other things.

The electromechanical drive elements can be in the form of actuators, with a displacement being produced by applying an electromagnetic signal, for example a piezoelectrically, magnetostrictively, electrostrictively or electrodynamically driven actuator.

DESCRIPTION OF THE DRAWINGS

FIG. 7B is an amplitude diagram corresponding to FIG. 7A.

FIGS. 10A through 10C show various arrangements of the inventive electromechanical motor with different displacement translation arrangements.

FIG. 12A is a side sectional view from above of an electromechanical drive system having two inventive electromechanical motors.

FIG. 12B is a sectional view of the system of FIG. 12A taken along line XII—XII in FIG. 12A.

FIG. 13A is a sectional view from above of a further electromechanical drive system with two inventive electromechanical motors.

FIG. 13B is a sectional view of the system of FIG. 13A taken along line XIII—XIII in FIG. 13A.

DESCRIPTION OF THE PREFERRED EMBODIMENTS

Figure 1:
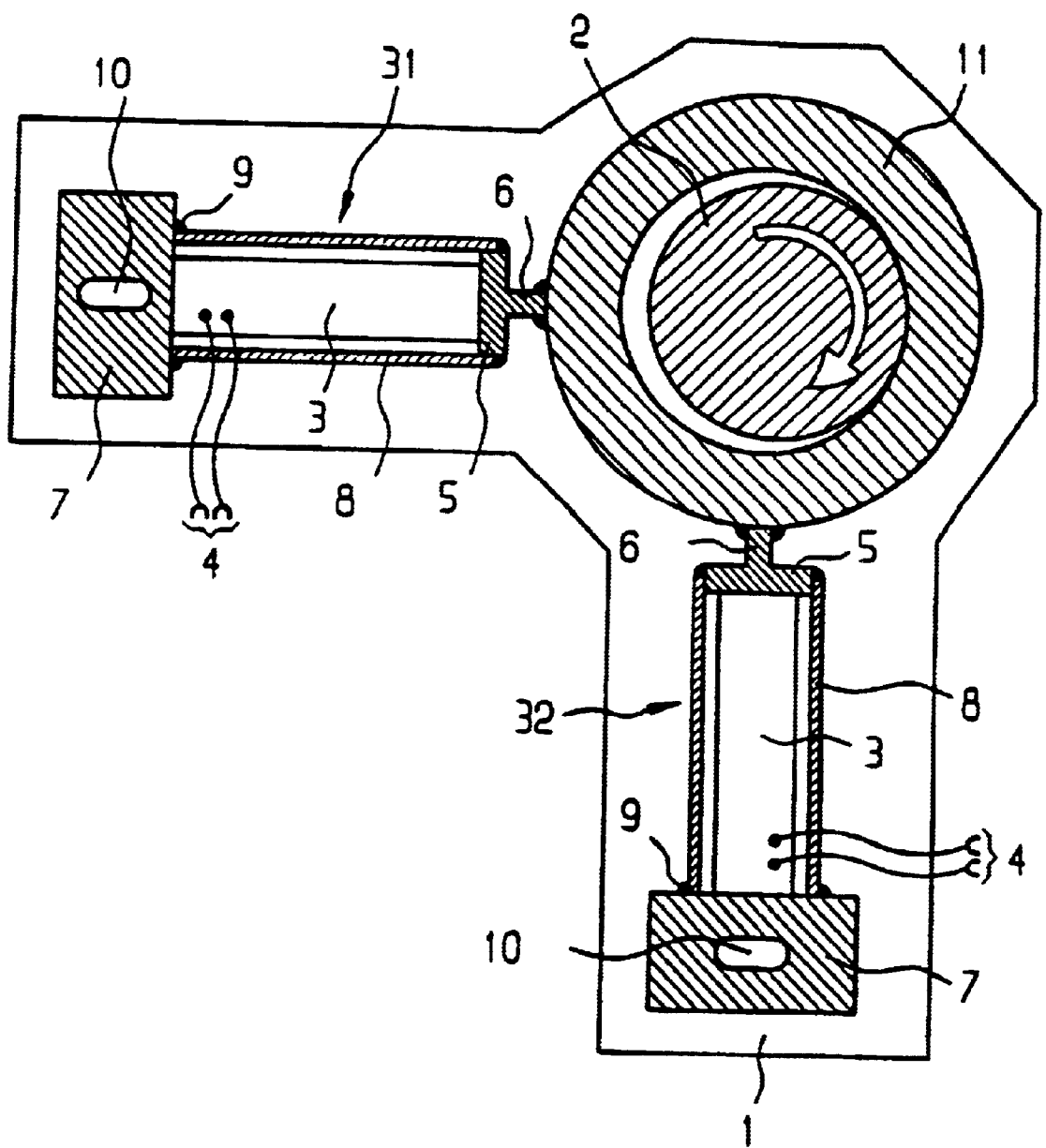
FIG. 1 is a sectional view from above of an inventive electromechanical motor with an internally disposed shaft in its basic position.

FIG. 1 shows an electromechanical motor A as sectional view from above.

The motor A is composed of at least one mechanical base plate 1 in which the shaft 2 of a motor is rotatably guided with a bearing as free of play as possible. Further, a first electromechanical drive element 31 and a second electromechanical drive element 32, each including a piezoelectric low-voltage multi-layer actuator (PMA) 3. The PMAs 3 can be respectively driven by an electrical amplifier via electrical leads 4. The electromechanical drive elements 31 and 32, however, can employ any other type of actuator that expands longitudinally in controlled fashion such as, for example, an electromagnetic, electrodynamic, electrostrictive or magnetostrictive actuator. As a result of the electrical drive of each PMA 3, in conformity with the behavior of a piezoelectrical longitudinal actuator, it expands in the axial direction approximately proportionally to the applied electrical voltage.

Each PMA 3 is installed under high mechanical compressive pre-stress between a head plate 5, that has a tappet 6, a bearing block 7 and a mechanically elastic (for example, slotted) tube spring 8. The mechanical compressive pre-stress serves for avoiding damage to the PMA 3 due to tensile forces that can otherwise occur in high-frequency continuous operation, as well as for resetting the PMA 3 when it is electrically discharged.

Since the linear displacement of the PMA 3 is reduced by the tube spring 8, the spring 8 should exhibit an optimally small spring constant relative to the stiffness of the piezo actuator (for example, a PMA 3 of 7×7×30 mm has $c_{Piezo}$=50 N/$\mu$m, so if the spring constant of the slotted tube spring $c_{spring}$=3 N/$\mu$m, the lift loss caused by the tube spring 8 amounts to (1−50/53)*100%=5.7%.

The durably firm connection of PMA 3, head plate 5, bearing block 7 and tube spring 8 ensues via welded connections 9. The bearing block 7 can be firmly screwed to the base plate 1 by screws conducted through oblong holes 10. This connection also can be produced by other means, for example by welding the bearing block 7 to the base plate 1.

In the embodiment of FIGS. 1–6, the electromechanical motor A has an optimally stiff and low-mass, concentric drive ring 11 having a diameter dR that is somewhat larger than the diameter dM of the shaft 2. The drive ring 11 is welded to the tappet 6 so that it is spaced from the base plate 1 and thus is freely movable above the base plate 1. The drive elements 31, 32 are rigidly connected to the base plate 1 via the bearing blocks 7 and are arranged at an angle of 90° relative to one another in the plane of the base plate 1, which here corresponds to the plane of motion, with their principal influencing directions being directed onto the mid-point of the drive ring 2.

This embodiment avoids the disadvantages of known piezo-drives due to the rolling of the rotatably seated shaft 2 on the inside of the drive ring 11 that is periodically circularly displaced by the combination of the linear displacements of the drive elements 31, 32, but the typical advantages of a piezo-motor are preserved.

Figure 7A:
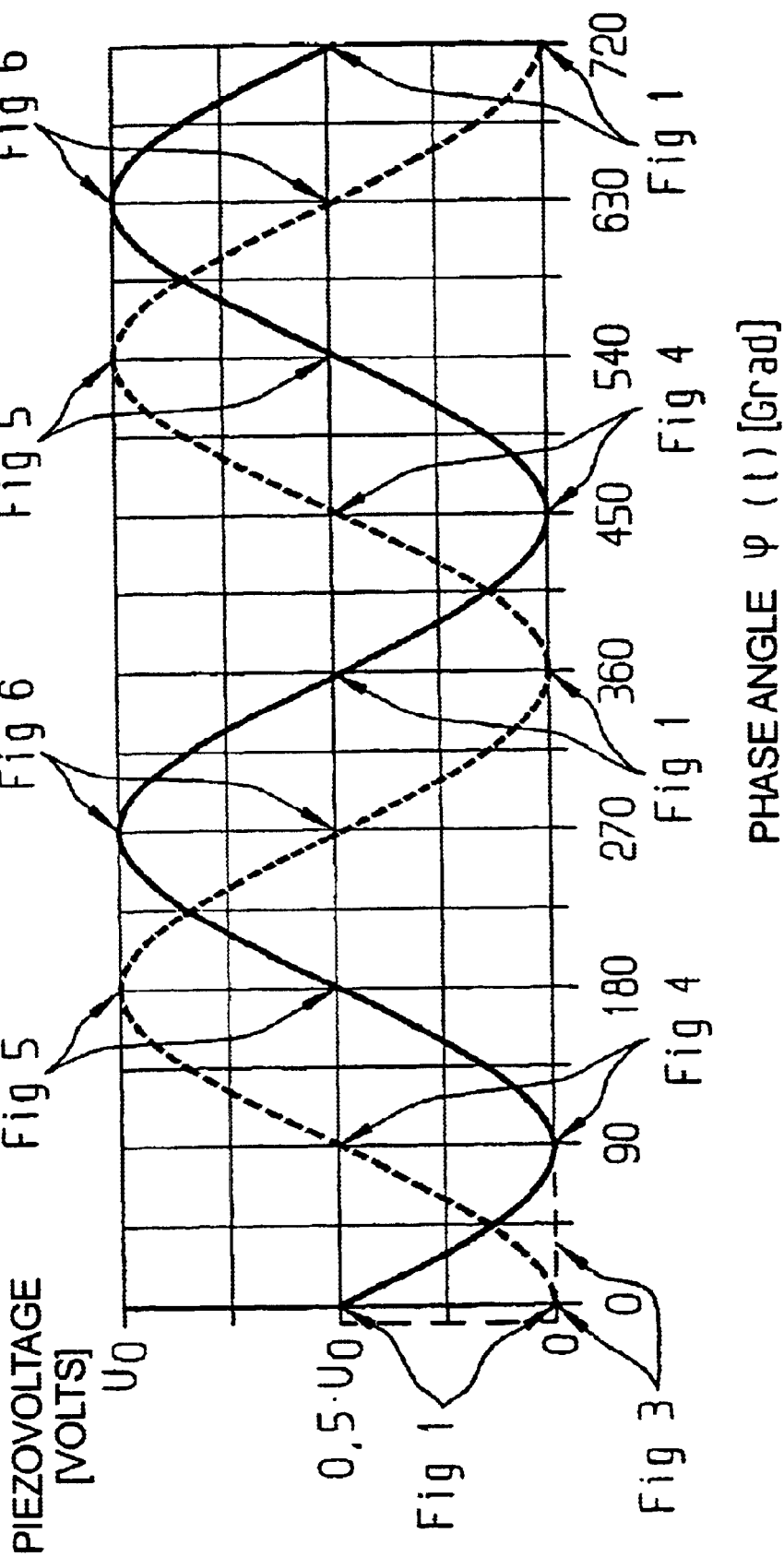
FIG. 7A illustrates the drive of the electromechanical actuators in the inventive electromechanical motor.

For producing the circular displacement motion of the drive ring 11, the two drive elements 31, 32 are driven with two sinusoidal voltage signals having the same peak amplitude that are phase-shifted by 90° relative to one another, similar to a Lissajous figure (see FIG. 7A). The gap dimension between the shaft 2 and the inside surface of the drive ring 11, in conjunction with the properties of the PMAs 3 and the mounting of the motor, is designed such that a high frictional lock between shaft 2 and drive ring 11 is present during every phase of the rolling motion, particularly when the motor is shut off (both PMAs 3 discharge).

Figure 2:
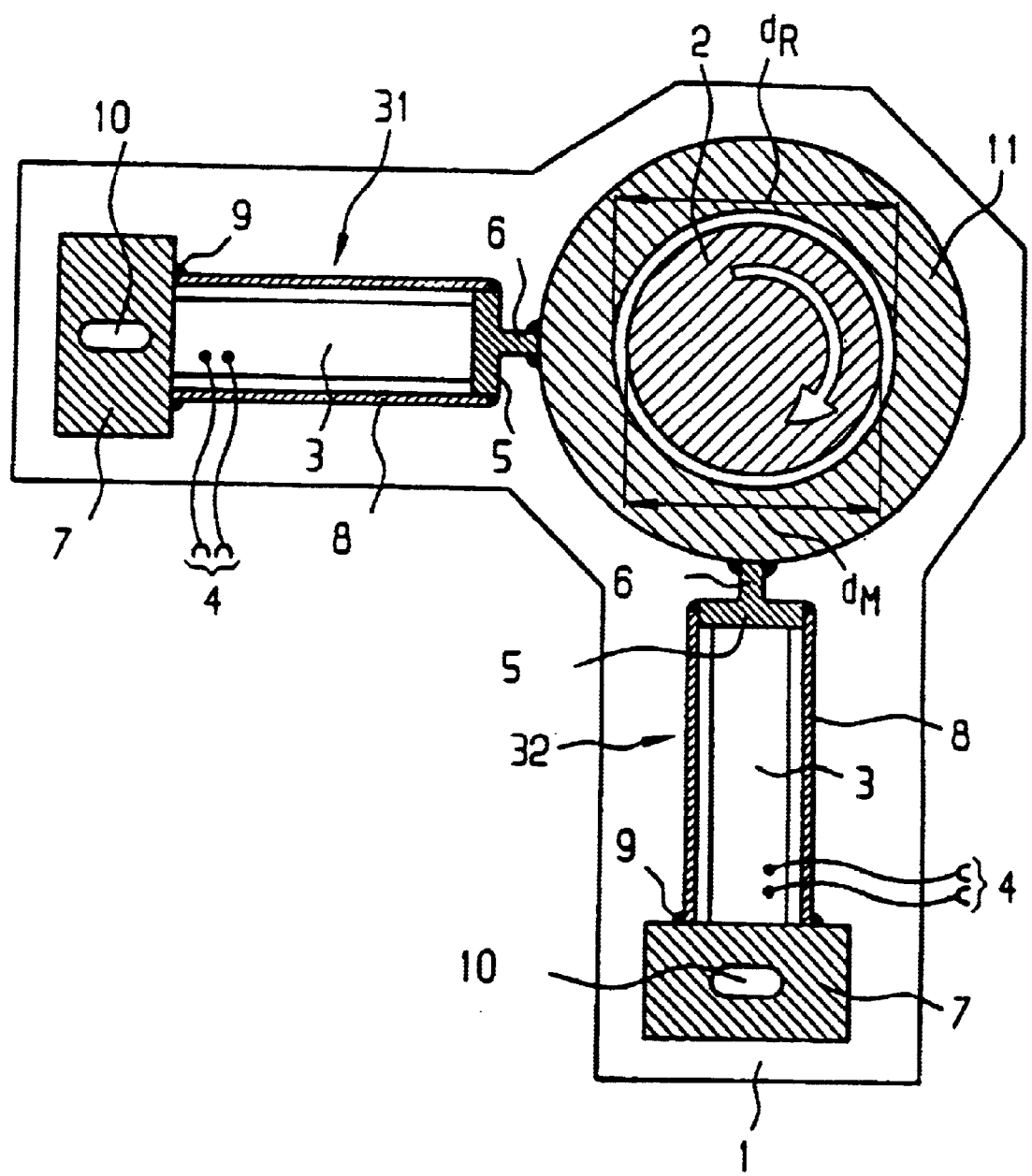
FIG. 2 shows the inventive electromechanical motor after assembly, before moving into the basic position.

FIG. 2 shows the electromechanical motor A directly after mounting before a setting of the quiescent position of the drive elements 31, 32.

The following considerations are employed for mounting the electromechanical motor A in basic position.

The outside diameter of the cylindrical shaft 2 amounts to $d_M$, the inside diameter of the concentric drive ring 11 amounts to $d_R$. The condition $d_R > d_M$ must be met, i.e. a slight gap dimension between shaft 2 and drive ring 11 matched to the displacement of each PMA 3 must be present. The unit composed of the welded PMA 3, pre-stressed in the tube spring 8, with the bearing block 7, head plate 5 and tube spring 8 is referred to below as electromechanical drive element 31, 32. The electromechanical properties of the drive element 31, 32 are determined, among other things, the no-load excursion xA, the blocking force FA and the rigidity cA. The mechanical compressive pre-stress force of the PMA 3 is referenced FP. As an example, a PMA 3 having the dimensions 7×7×30 mm is considered, this being welded in pressure pre-stressed fashion in a tube spring 8 as set forth above. Typical values for the drive elements 31, 32 resulting therefrom are:

xA=40 $\mu$m
FA=2120 N
cA=53 N/$\mu$m
FP=1000 N

In the basic condition of the electromechanical motor A (both PMAs 3 discharged), the shaft 2 should be blocked (inhibited). Moreover, the PMAs 3 during motor operation should, optimally, be operated only unidirectionally, i.e. with positive voltages corresponding to the polarization direction of the PMA 3. This can be achieved by the following static mounting sequence.

First, both PMAs 3 are discharged and the drive ring 11 is located in an arbitrary position relative to the shaft 2. The special instance of a central position of drive ring 11 and shaft 2 is shown in FIG. 2 for this condition.

The PMA 3 of the first drive element 31 remains discharged, whereas the PMA 3 of the second drive element 32 is charged to half the nominal operating voltage $U_0$. Accordingly, the first drive element 31 is not elongated; it is in its basic position. The second drive element 32 is elongated by half the value of its no-load excursion, i.e. by 20 $\mu$m. The positions of the shaft 2 and the drive ring 11 do not yet play a part.

Due to the force acting at the bearing block 7 of the first drive element 31 in the longitudinal axis of the PMA 3 and through the mid-point of the drive ring 11, this force being directed toward the left and being applied from the outside, the drive ring 11 is moved against the shaft 2 and a frictional lock between shaft 2 and drive ring 11 is produced at that point of the drive ring 11 lying opposite the tappet 6. As a result the position already shown in FIG. 1 occurs.

This contact force, typically in the region of 500 N, can be extremely high but should not exceed the pre-stress force of the PMA 3 in the tube spring 8.

This pressing power is assumed to be 500 N in the present example.

Figure 3:
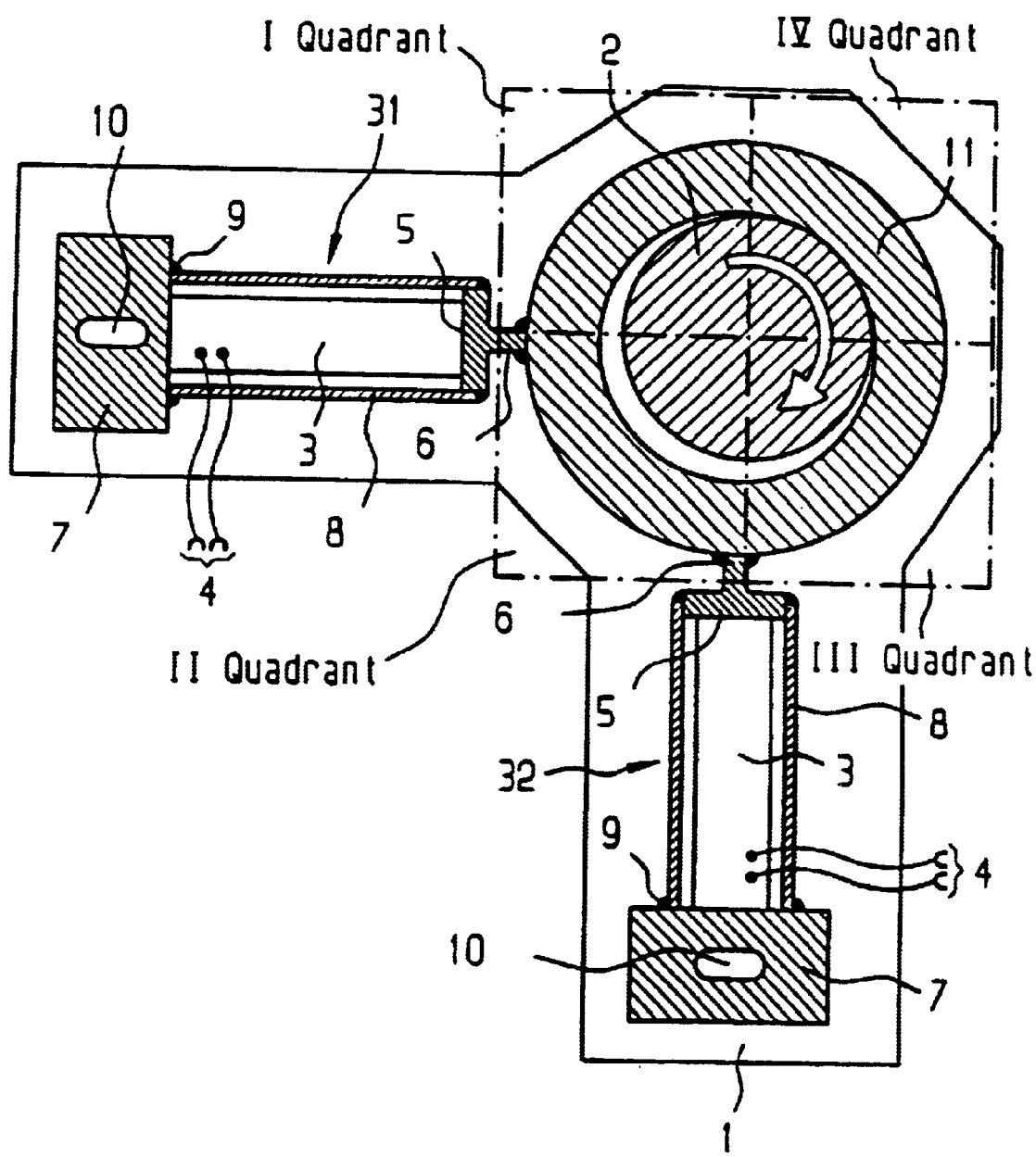
FIGS. 3 through 6 respectively show the inventive electromechanical motor in various positions during operation thereof.

FIG. 3 shows the electromechanical motor A in a position wherein the contact between shaft 2 and drive ring 11 is located in the fourth quadrant (basic position). The bearing blocks 7 are rigidly connected to the base plate 1 (for example, screwed, welded).

In order to place the motor A into the basic position proceeding from the position shown in FIG. 2, the second drive element 32, with the half-charged PMA 3, is completely discharged. As a result of the contraction of the PMA 3 connected therewith, the contact point between drive ring 11 and shaft 2 migrates into the fourth quadrant, i.e. into a position at a greater distance from the second drive element 32 and lying closer with respect to the first drive element 31. As a result the pressing power continues to increase. This position of the motor A then is as shown in FIG. 3.

Due to the frictional lock between drive ring 11 and shaft 2 in conjunction with the bearing blocks 7 rigidly welded to the base plate 1, the shaft 2 is now blocked from performing rotational movement.

The above-described mounting sequence is only one of several that are possible. For example, the drive ring 11 given a discharged PMA (both) can also be brought into contact with the shaft 2 in the fourth quadrant by a mounting force that is directed away from the mid-point of the drive ring 11 and proceeds through the second quadrant, and this position can be fixed, for example by welding or screwing the bearing blocks 7 to the base plate 1.

Figure 4:
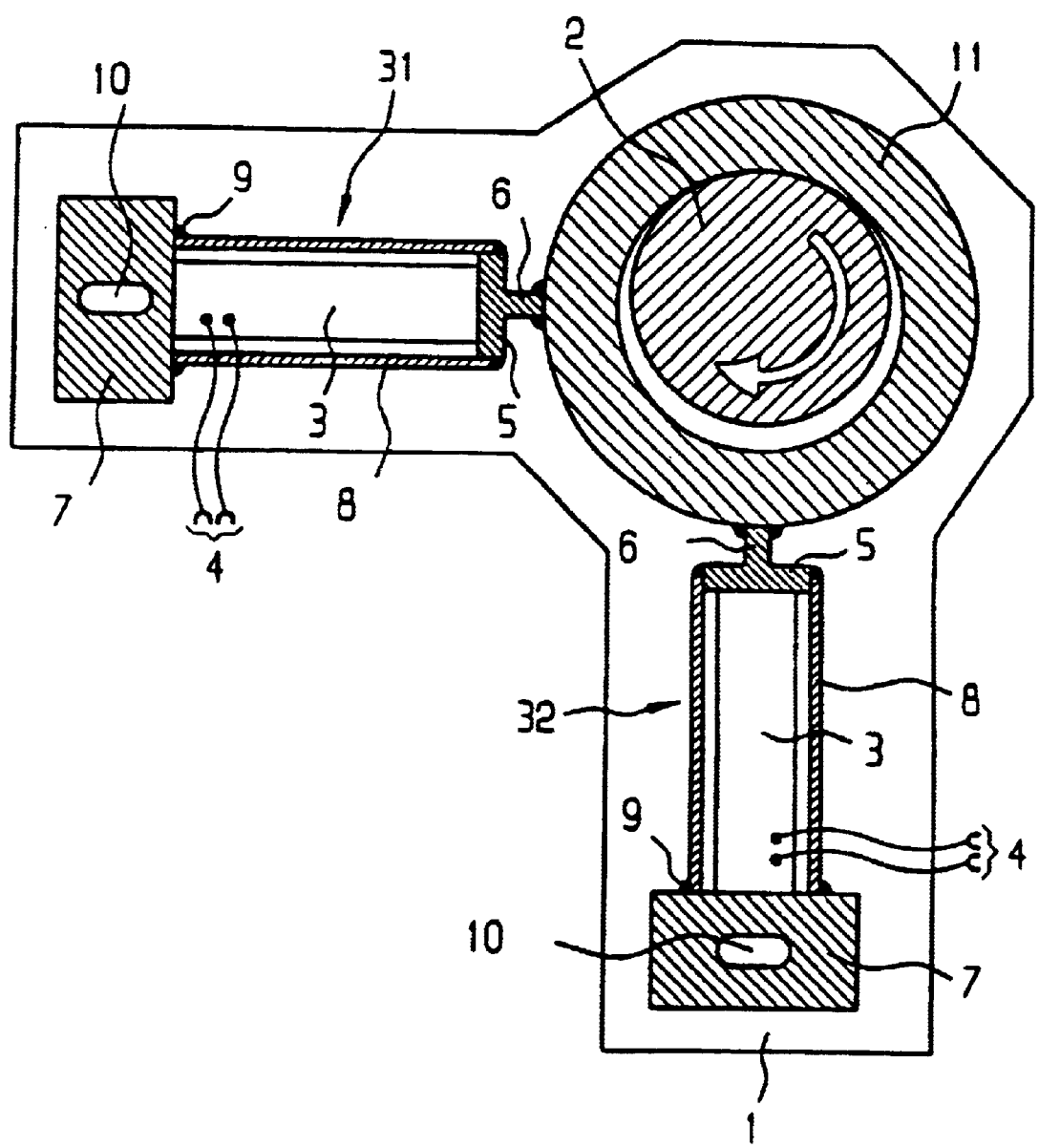

FIG. 4 shows an electromechanical motor A wherein the drive ring 11 is lying on the boundary between the first quadrant and the fourth quadrant.

Figure 5:
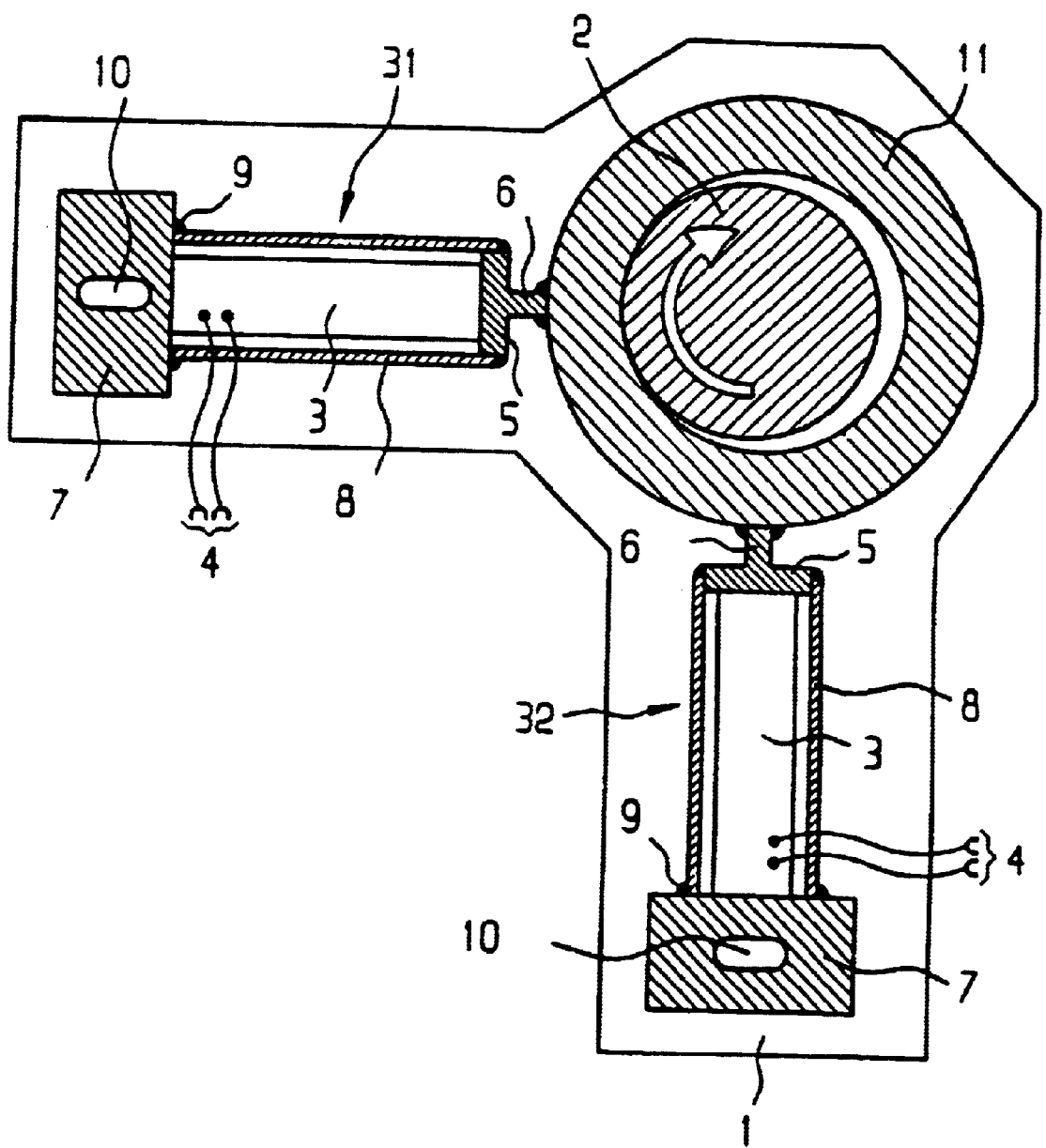

FIG. 5 shows an electromechanical motor A wherein the drive ring 11 lies on the boundary between the first quadrant and the second quadrant.

Figure 6:
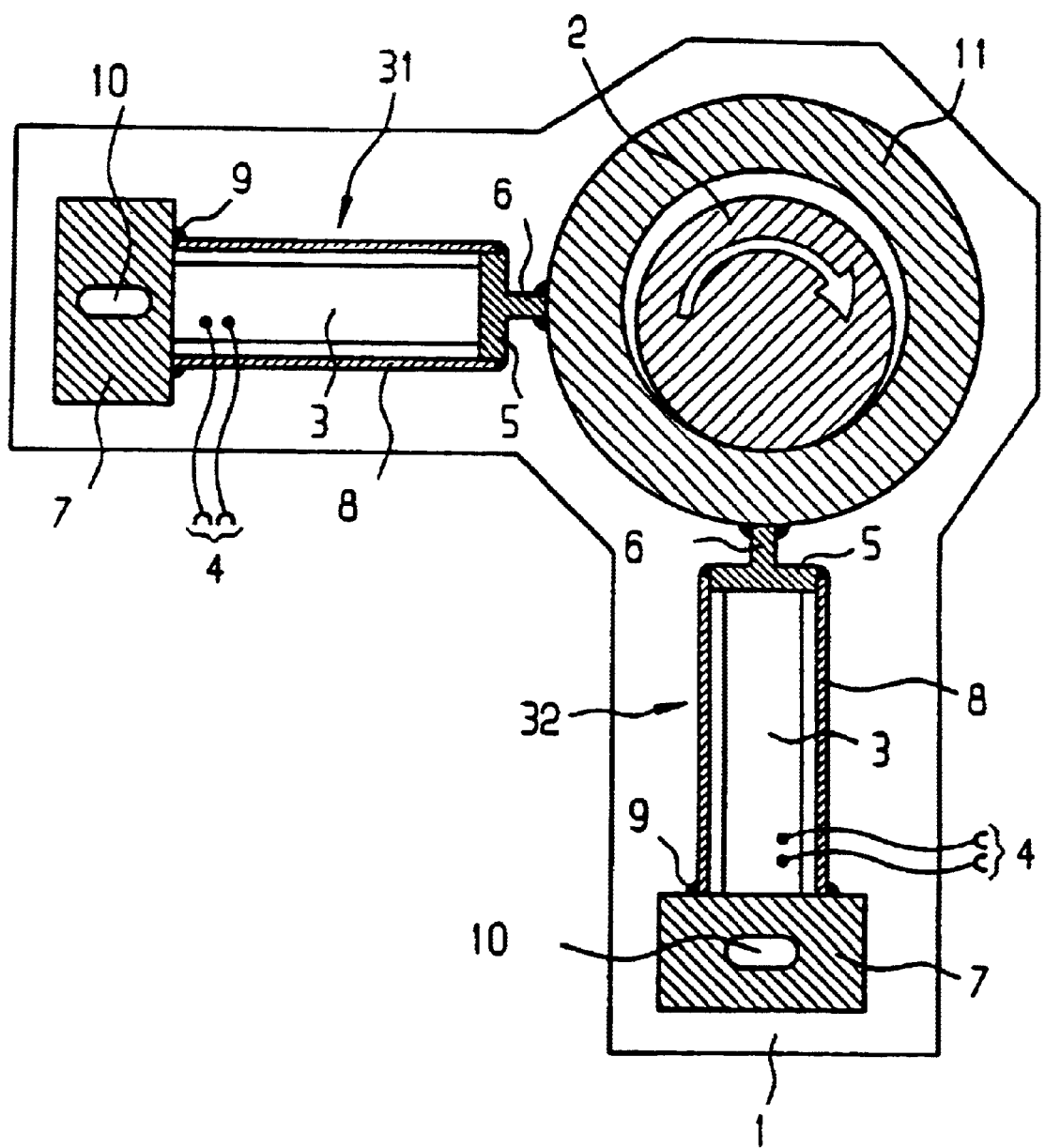

FIG. 6 shows an electromechanical motor A wherein the drive ring 11 lies on the boundary between the second quadrant and the third quadrant.

FIG. 7A shows the piezo voltage in volts of the PMAs 3 of the drive elements 31, 32 of the motor A from FIGS. 1 through 6 with respect to a phase angle $\Phi(t)$ in degrees.

FIG. 7B shows the amplitude diagram corresponding to FIG. 7B as an indication of the control voltage applied to the PMAs 3.

An exemplary sequence for initialization of the electromechanical motor A is as follows.

Proceeding from the quiescent position shown in FIG. 3, the shaft 2 can be placed into rotation by applying unipolar sinusoidal voltages phase-shifted periodically by 90° to the two PMAs 3, for example as shown in the phase diagram of FIG. 7A.

The absolute phase position of the two drive signals with which the PMAs 3 of the motor A are placed into operation fundamentally plays no part, as long as the relative phase displacement between the two sinusoidal drive signals amounts to 90° (otherwise, the frictional lock between shaft 2 and drive ring 11 could be briefly lost, but even this results in no disadvantageous consequences as long as this operating condition is quickly traversed).

As symbolically indicated in FIG. 7A, half the nominal operating voltage can, for example, be applied initially to the PMA 3 of the second drive element 32, the motor A initially proceeding into the position already shown in FIG. 1 as a result thereof.

Proceeding from the position shown in FIG. 1, the periodic drive of the two PMAs 3 is now begun, with the electrical signal voltages at the PMAs 3 satisfying, for example, the condition:

$$U_{PMA31}(t)=U_0 \cdot \{1+\sin (\Phi(t)+(3/2)\cdot \Pi\} \quad \text{[Volts]}$$

$$U_{PMA32}(t)=U_0 \cdot \{1+\sin (\Phi(t)+\Pi)\} \quad \text{[Volts]}$$

The phase positions of the appertaining drive voltages are shown in FIG. 7A). As the displacement diagram in FIG. 7B) shows, a periodic, circular displacement of the drive ring 11 results therefrom, this being converted into a rotational movement of the shaft 2 by the durable frictional lock with the shaft 2. The positions according to FIG. 1→FIG. 4→FIG. 5→FIG. 6→FIG. 1, etc. are thereby sequentially and periodically executed by the motor A.

For the following reasons, the displacement motion of the drive ring 11 is not exactly circular: hysteresis of the PMAs 3, articulation of the drive ring 11 to the two PMAs 3, deformation of the drive ring 11 due to mechanical forces. This distortion, however, can be compensated by a distortion-correction of the drive signals, which then are no longer exactly sinusoidal. In particular, the complete region indicated with hatching in FIG. 7B) can be electrically driven. As a result, all operating conditions relevant for the motor A can be electrically driven, for example reduced hold/torque, increased retaining moment or free running of the motor shaft. Likewise, the rotational sense can be commutated by the phase shift of the two drive signal voltages for the PMAs 3 (shift of the drive signals by ±Π relative to one another).

Advantages of the inventive electromechanical motor A are as follows.

Minimum mechanical wear as a result of the rolling of the shaft 2 on the inside surface of the drive ring 11.

Constant, high frequency-independent torque.

Low creation of noise due to the rolling of the shaft 2 on the drive ring 11.

No slippage due to continuous frictional lock between shaft 2 and drive ring 11.

A minimum number of two PMA 3 is adequate for the operation of the electromechanical motor A.

The shaft 2 is blocked in the basic position (the electromechanical motor A, however, can also be mounted such that free running is present in the basic position, see FIG. 2). By approaching operating points within the circular phase diagram shown at the bottom left in FIG. 7B, arbitrary operating conditions can be executed; thus, for example:

the shaft 2 can be held (arrested) in every arbitrary angular position with high force (blocked).

the retaining moment and the drive torque of the motor A can be designationally controlled.

the shaft 2 can be switched to free wheeling at any time (both PMA 3 are thereby kept approximately half-driven).

The electromechanical motor A can be statically driven, or driven with low drive frequency.

The electromechanical motor A can be operated at high-frequency.

The electromechanical motor A can be operated electrically as well as mechanically resonant. When the electrical and mechanical resonance are matched to one another, extremely high performance values and a high efficiency are achieved.

With a given geometry of the electromechanical motor A, the rotational speed can be electrically controlled by the drive frequency of the PMAs 3.

With a given geometry of the electromechanical motor A, the torque can be electrically controlled by the height of the drive voltages.

The rotational sense can be commutated by commutating the phase position of the two sinusoidal drive voltages of the PMA 3.

Arbitrary changes can be made during operation between the aforementioned operating modes.

The electromechanical motor A is scalable in broad ranges in terms of its power values (torque plus rated speed).

The step-down ratio of the electromechanical motor A derives from the circumferential difference between outside circumference $L_M$ of the shaft 2 and inside circumference $L_R$ of the drive ring 11. An exemplary calculation relating thereto is as follows.

A PMA 3 housed in a tube spring 8 having the spring constant $c_{spring}$=3 N/μm and having a structural length 30 mm typically has a no-load excursion of xA=40 μm given a blocking force FB=2120 N. For the drive ring 11 to be capable of being pressed against the shaft 2 with a force of 500 N in every position, an effective maximum gap dimension of approximately s=31 μm derives. When the diameter of the shaft 2 amounts to $d_M$=10 mm (circumference $L_M$=Π·$d_M$), then $d_R$=10.031 mm ($d_R$=$d_M$+s) follows therefrom for the inside diameter and ΔL=Π·($d_R$−$d_M$)→ΔL=Π·s→ΔL=97 μm derives for the circumferential difference. The angular rotation ΔΦ of the shaft 2 per complete cycle of the circular displacement motion of the drive ring 11 drives therefrom as

ΔΦ=360°·(ΔL/$L_M$)

→ΔΦ=360°·(s/$d_M$) per cycle             (Eq. 1)

→ΔΦ=1.1° per cycle

As Equation 1 shows, the angular feed per cycle of a complete displacement motion of the drive ring 11 is a direct function of the ratio of gap dimension to diameter of the shaft 2. Both quantities can be influenced in a simple way, whereby the torque of the electromechanical motor A, of course, is dependent on the diameter of the shaft 2, inversely from the motor speed. When the motor A is operated at a frequency of 327 Hz, the speed of the shaft 2—in order to remain within the above example-amounts to one revolution/sec. The torque thereby generated by the motor 2 only can be estimated due to the influences of the stiffness of base plate 1, weld 9 and that of the drive ring 11. It lies in the region of a few Newton meters. Given a fixed drive frequency and drive amplitude of the PMA 3, the torque, however, can be greatly increased by enlarging the diameters of the shaft 2 and drive ring 11, and then will operate at a correspondingly lower speed. Due to the fact that such an electromechanical motor A can be operated at frequencies of a few kilohertz, excellent electromechanical performance features are achieved.

The shaft 2 as well as the drive ring 11 can be economically manufactured as machined parts with high precision.

The electromechanical motor A is suitable for use with low cost low-voltage high-performance multi-layer actuators.

Space-saving and low-mass structure with run-up/stop times in the millisecond range.

Reactions onto the shaft 2 can be detected by electronic interpretation of the piezo-voltage curves and, for example a clamp protection can thus be realized without additional outlay for sensors.

Exemplary Variations/Improvements

Figure 8:
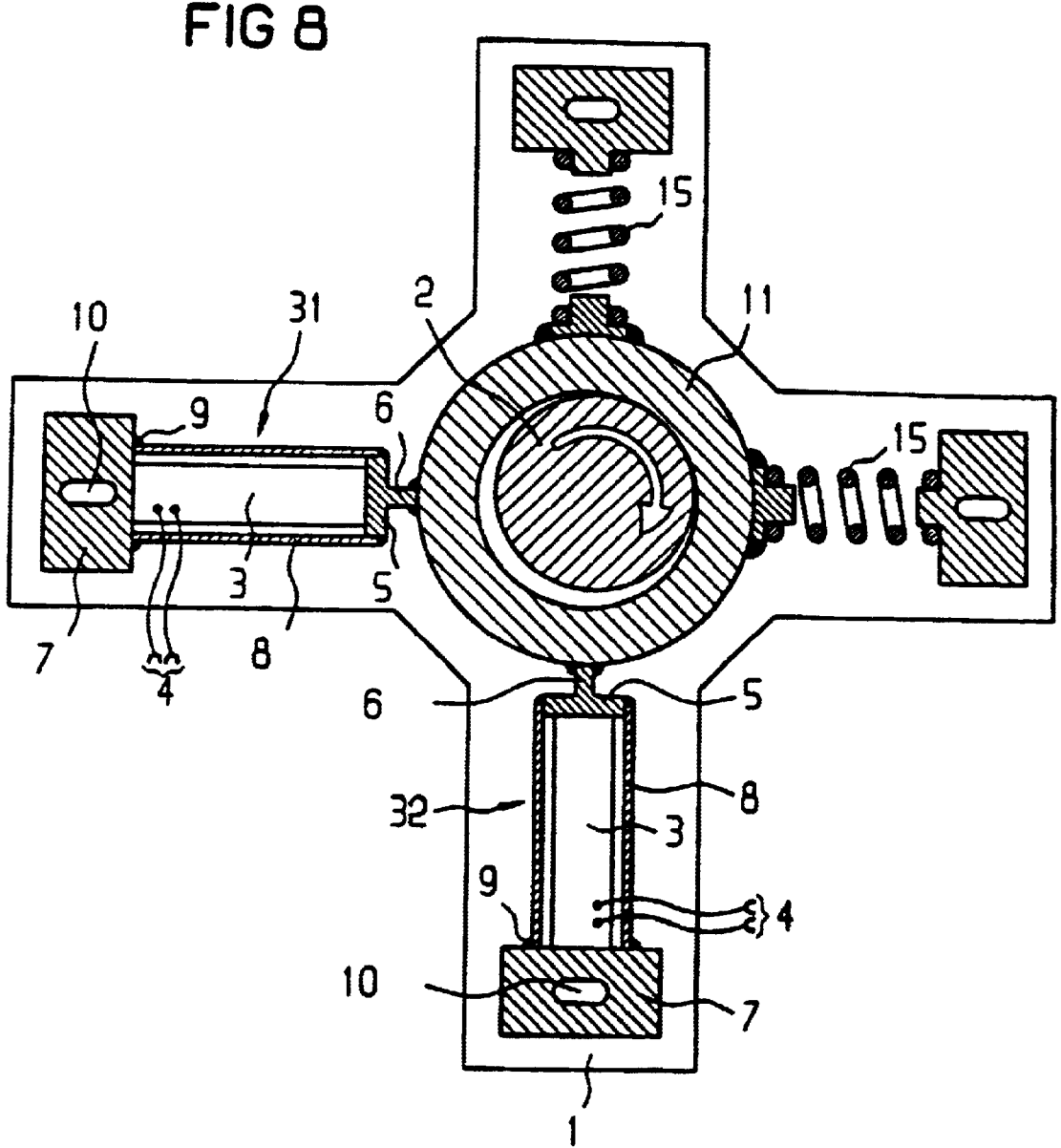
FIG. 8 shows a further embodiment of the electromechanical motor in a sectional view.
Figure 9:
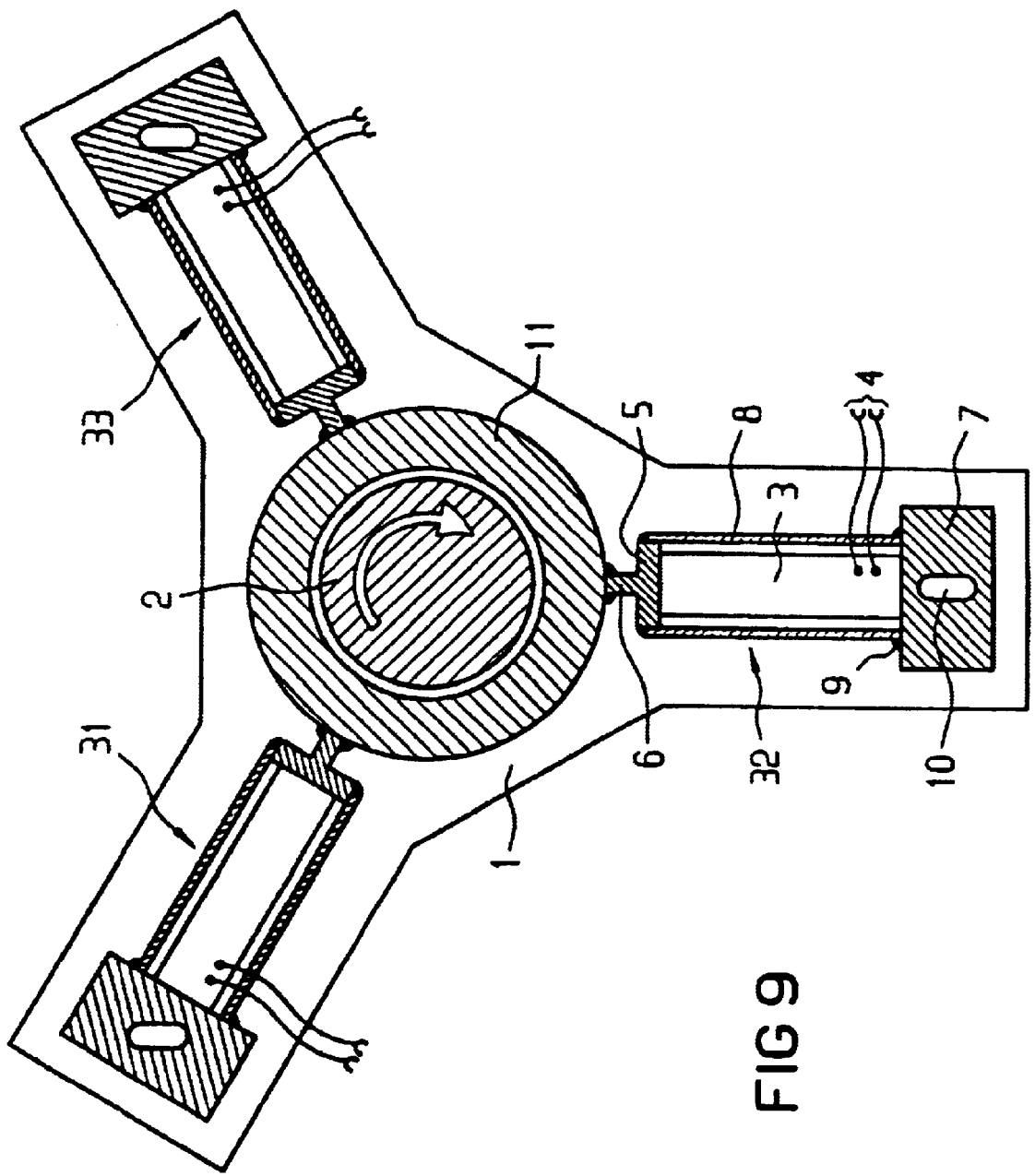
FIG. 9 shows a further embodiment of the electromechanical motor in a sectional view.

Numerous further structures having certain improvements can be derived from the inveritive motor principle, for example:

1. Symmetrification of the application of force into the drive ring 11 by attaching restoring springs 15 to the outside circumference (FIG. 8) or by arranging further PMAs 3 at the outside circumference of the drive ring 11 (FIG. 9);

Due to the forces acting on the drive ring 11, this is elastically deformed and thus deviates from the ideal circular shape. This influence can be corrected or minimized by:

a very stiff mechanical structure of the drive ring 11, an optimally symmetrical action of forces of the drive elements 31, 32, 33 on the drive ring 11. FIG. 8 initially shows an example of this, where a strong, mechanical restoring spring 15 is arranged at that side of the drive ring 11 facing away from the PMA 3, so that a uniform introduction of the force over the circumference of the drive ring 11, and thus a lower and more symmetrical deformation of the drive ring 11, is achieved (as a result, moreover, the tensile stress on the welds of the tappets are reduced). The same can also be achieved by attaching more than two PMAs 3 to the outside surface of the drive ring 11, as shown in FIG. 9 for three piezo-actuators;

an adaptation (distortion correction) of the drive signal shape. The PMAs 3 are thereby electrically driven such that, taking the elastical deformation of the drive ring 11 into consideration, a constant pressing power is established between drive ring 11 and shaft 2 and a uniform round running occurs. Since there is also the possibility of differently individually driving the PMAs 3, not only with reference to the phase but also with respect to the drive amplitude, the individual PMAs 3 need not necessarily exhibit exactly same structural shape or specific displacement excursion. For example, the circular displacement of the drive ring 11 can also be achieved by a short piezo that is operated with a high drive voltage in combination with a long piezo arranged at a right angle relative thereto that is operated with lower drive voltage.

2. Increasing the displacement motion of the drive ring 11 with mechanical or hydraulic lift enhancers (levers, piston-hydraulics, piezo-electrical flex transducers).

According to Equation 1, an increase in the rotational speed of the shaft 2 can be achieved by reducing the diameter $d_M$ of the shaft 2 and/or by increasing the gap dimension s. The gap dimension s is limited by the generally small lift of the PMAs 3 of 10 . . . 100 μm, since the drive ring 11 should always be held seated with the shaft 2 with a specific force.

The slight piezo stroke, however, can be substantially enlarged with the assistance of adjustment path enhancers such as mechanical levers or hydraulic lift translators. A mechanical lever translator composed, for example, of lever bearing 15, lever articulation 16 and lever arm 17 can, as shown in FIG. 10, be integrated into the design of the motor A in a simple way. As a result extremely compact, use-adapted structures are possible (see the various embodiments in FIGS. 10A through 10C). Due to the lift-translated displacement motion of the drive ring 11, substantially higher speeds can now be realized with a correspondingly enlarged gap dimension given the same diameter.

Figure 11:
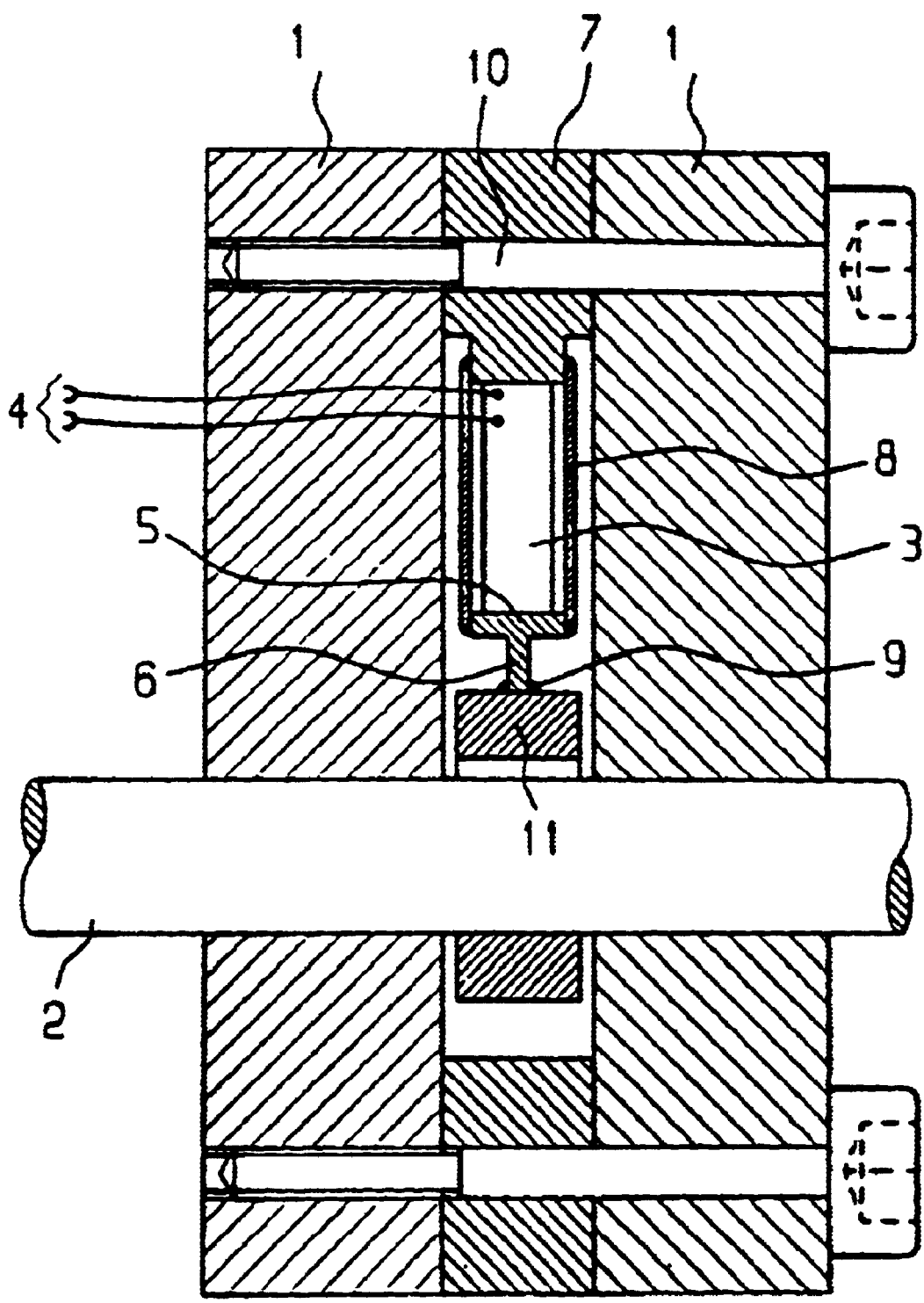
FIG. 11 is a side sectional view of the inventive electromechanical motor.

3. An important pre-requisite for the functioning of the described motor A is an adequately high mechanical rigidity of the entire structure and a shaft 2 that is seated as free of play as possible. Moreover, a strong tilting moment acts on the motor shaft in the structures described in the preceding figures having only one base plate 1, arising as a result of the necessary pressing power between the drive ring 11 and the shaft 2. The following improvements can alleviate this:

attaching the drive elements 31, 32, 33 between at least two base plates 1, with the shaft 2 seated or conducted through free of play, as shown in FIG. 11. In addition to the greater mechanical rigidity of the arrangement shown in FIG. 11, a further advantage is that the force acting on the shaft 2 from the drive ring 11 does not lead to a tilting moment on the shaft 2.

Drive of the shaft 2 with a number of drive rings coupled together in phase locked fashion.

As a result of one or both of these measures, the bearing of the shaft 2 can be kept entirely free of forces and the disadvantageous influence of the bearing plate can be entirely avoided even though in the arrangement shown in FIG. 11, both bearings still must absorb transverse forces. To achieve improved freedom from play of the bearings is, as important for proper functioning, the arrangement shown in FIG. 12 has two drive rings 11, 12 driven common and arranged close to one another, which allows the transverse forces acting from the drive rings via the shaft 2 onto the two bearings to be greatly minimized. The two drive rings 11, 12 are mounted for this purpose so that the two contact points on the shaft 2 lie opposite one another. For the operation of the motor A, both drive rings 11, 12 are displaced in the same direction (i.e. not oppositely) by the PMA 3 so that the two contact points also always lie opposite one another during operation. To this end, one PMA 3 of the first ring can be connected to a PMA 3 of the second ring, so that the motor A also does not differ electrically from a single-ring motor.

FIG. 13 shows a structure that is particularly advantageous in terms of its motive action. This electromechanical motor A has three drive rings 11, 12, 13, namely an upper drive ring 11, a middle drive ring 12 and a lower drive ring 13. In the simplest case, the upper drive ring 11 and the lower drive ring 13 are mechanically rigidly connected to one another (force-coupled and referred to below as a common ring) and are in turn mounted such that the contact point of the middle ring 12 lies opposite the contact points of the lower ring 13 and of the upper ring 11 on the shaft. Since the common drive ring is driven by two PMAs 3 and the middle ring is in turn driven by two PMAs 3, one PMA 3 of the common drive ring also can be electrically interconnected to a PMA 3 of the middle ring (parallel or in series). In terms of function, the motor A thus corresponds to that shown in FIG. 12, with the further advantage that the shaft 2 is now completely free of moments and completely free of forces due to the arrangement of the drive rings (bending moments and transverse forces), so that only the drive moment takes effect toward the outside.

There is thus the possibility of completely foregoing a bearing for the shaft 2. In this case, the shaft 2 merely has to be mounted at locating outside of the motor A. The pressing powers of the drive rings of the motor shaft 2 that are set during mounting and that take effect during operation are selected of equal size for this purpose. For example, the contact surface of each outer ring 11, 13 is only half as large as that of the middle ring 12. During mounting, the pressing power of each outer ring 11, 13 will therefore be set, for example, to 250 N and that of the middle ring 12 will be set to 500 N in order to achieve the freedom of the motor shaft from moments and forces. Instead of the mechanical connection of upper ring 11 and lower ring 13, of course, these can also have separate drive elements and then be suitably coupled in phase locked fashion to one another in an electronic way.

Figure 14:
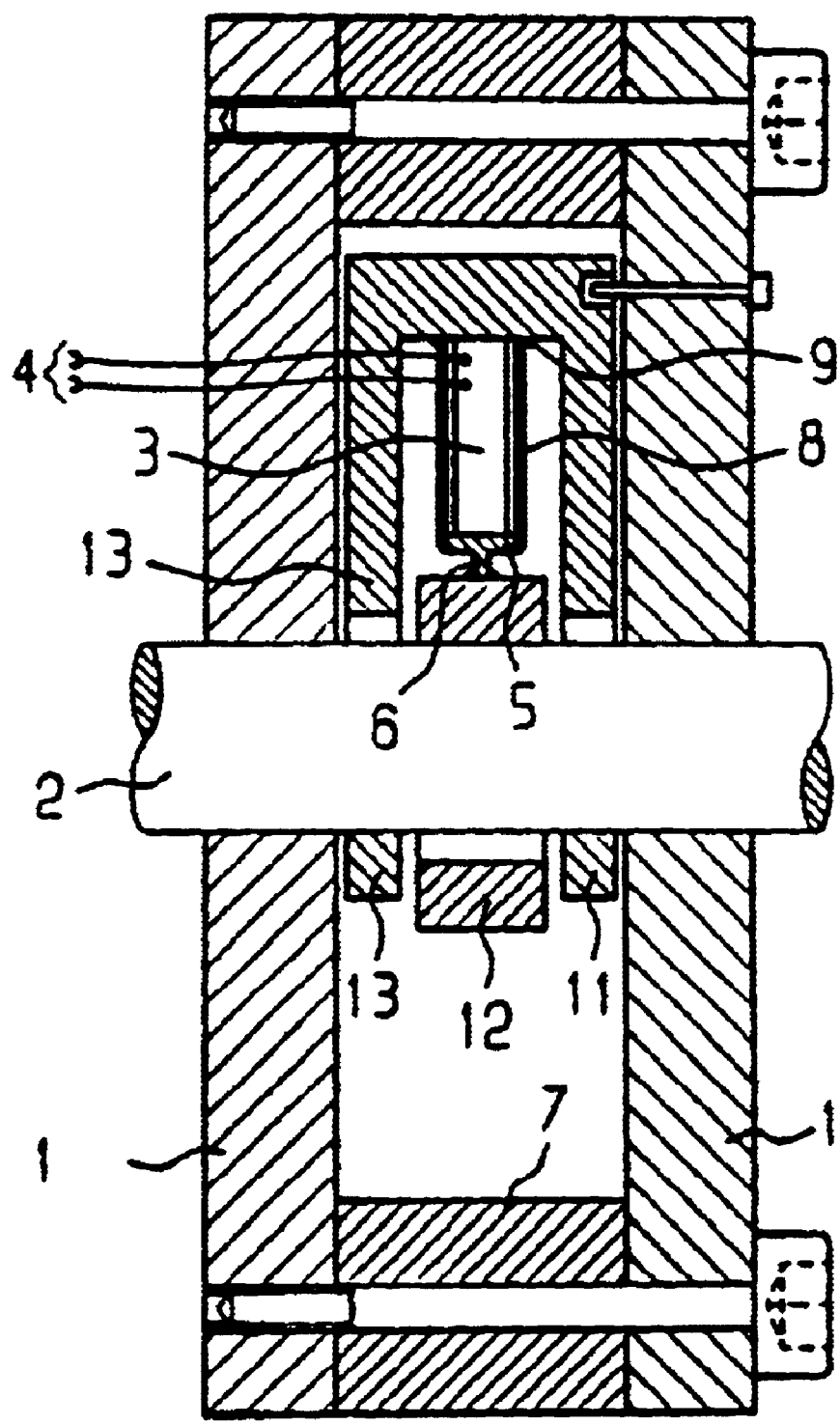
FIG. 14 is a sectional view of a version of a three-ring motor in accordance with the invention.

FIG. 14 shows a further version of the three-ring motor from FIG. 13 that only requires a total of two PMAs 3. The PMAs 3 are arranged between the two drive rings (common ring 11, 13 and middle ring 12) so that the drive rings are displaced toward one another upon drive of the PMAs, causing the shaft 2 to be clamped at points that lie opposite one another. Given drive of the two PMA 3 with sinusoidal voltage signals and maintaining a constant ±90° phase relationship (rotational sense), the shaft 2 rolls on the drive rings at opposite points, causing the shaft 2 to be placed into rotation. By using a cross-pin that allows only small movements of the drive rings, the torque acting on the drive rings is thereby transmitted to the housing and a rotation of the motor shaft thus is prevented.

Figure 15B:
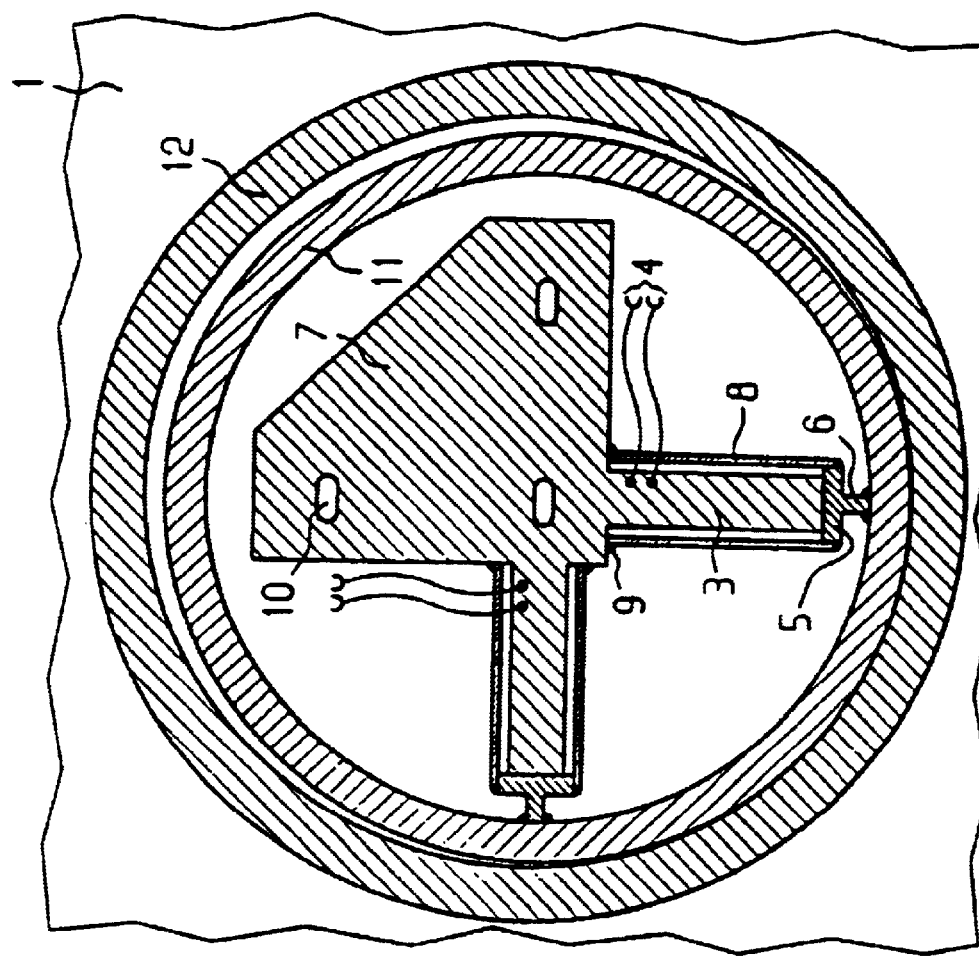
FIG. 15B is a sectional view from above of the inventive electromechanical motor of FIG. 15A taken along line XV—XV of FIG. 15A.
Figure 15A:
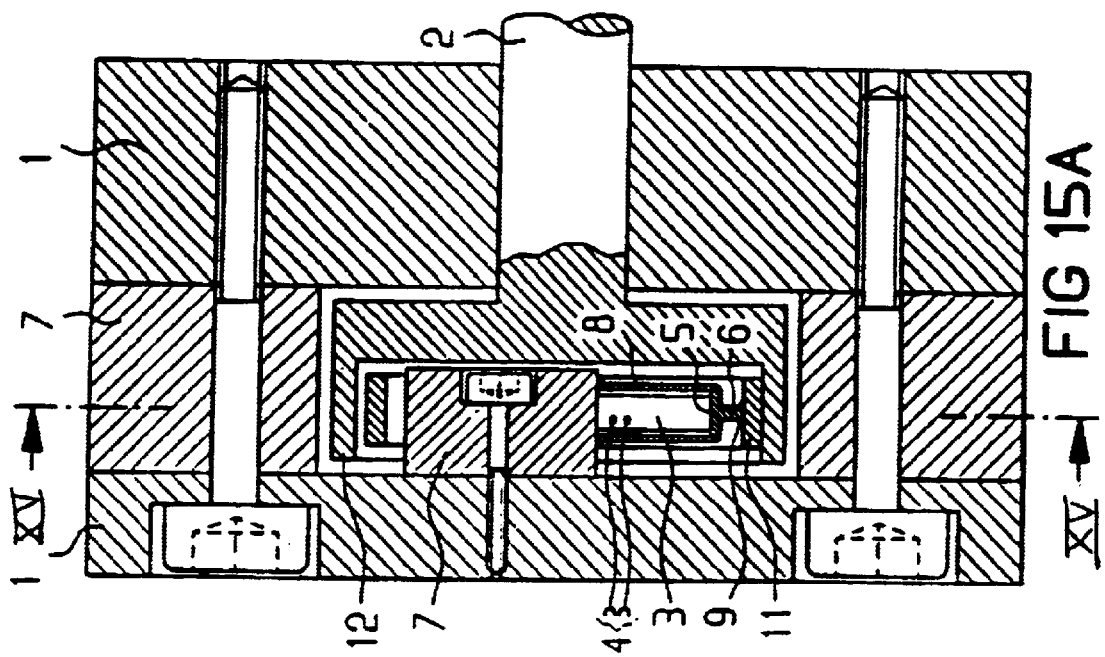
FIG. 15A is a side sectional view of an inventive electromechanical motor with an externally disposed shaft.
Figure 16A:
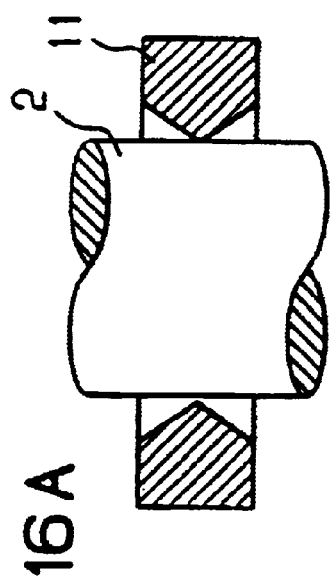
FIGS. 16A through 16F respectively show contact profiles between the drive ring and the shaft in the inventive electromechanical motor in side sectional views.
Figure 16B:
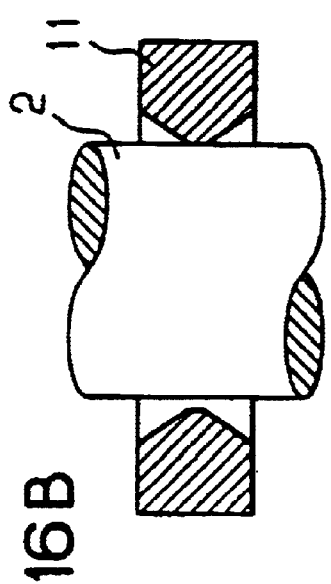
Figure 16C:
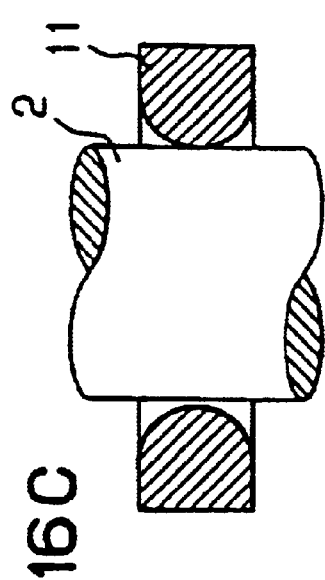
Figure 16D:
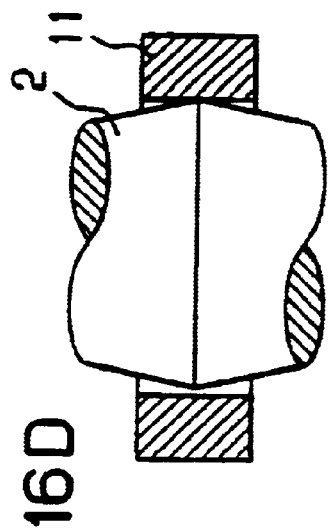
Figure 16E:
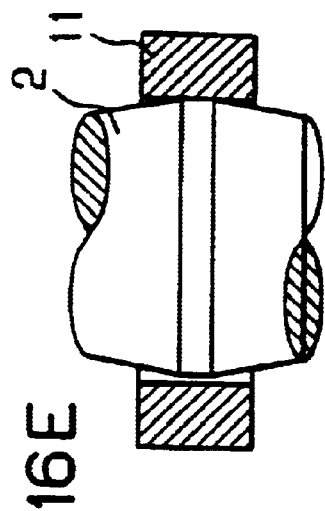
Figure 16F:
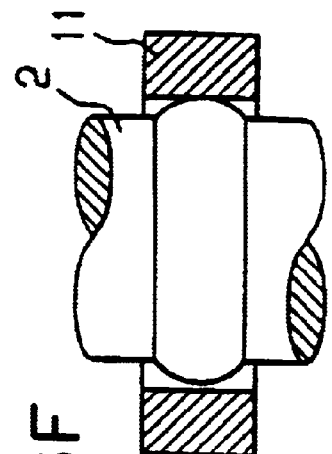

4. The drive principle also can be implemented in an embodiment wherein the outside surface of the drive ring 11 contacts the shaft 2, as shown in FIG. 15. At least two PMAs 3, which, as FIG. 15 shows, can also lie inside the drive ring 11 and that have their bearings 7 supported at the base plates 1, drive the drive ring that acts on a drive flange 12 that is connected to the motor shaft 2.

5. For increasing the frictional coefficient or for improving the frictional lock between shaft and drive ring, the corresponding surfaces can:

exhibit a defined surface roughness have a micromeshing, whereby the tooth spacing corresponds to a whole multiple of the circumferential difference be composed of suitable pairings as of material.

6. Given adherence to the corresponding operating limits, the PMA 3 can be driven not only unipolarly but bipolarly as well.

7. In order to minimize the influence of tilting of the drive rings relative to the motor shaft, the corresponding contact surfaces between the drive ring 11 and the motor shaft 2 can, instead of exhibiting a cylindrical geometry, alternatively have suitable, different shapes, for example conically tapering or crowned, as indicated in FIGS. 16A through 16F.

Although modifications and changes may be suggested by those skilled in the art, it is the intention of the inventors to embody within the patent warranted hereon all changes and modifications as reasonably and properly come within the scope of their contribution to the art.

We claim:

1. An electromechanical motor comprising:

two electromechanical drive elements respectively producing linear displacements;

a non-deformable drive ring;

rigid, non-articulated mechanical connections respectively connecting said drive elements to said drive ring for causing said drive ring to execute a circulatory displacement motion by a combination of said linear displacements with no deformation of said drive ring; and a shaft in rolling line contact with said drive ring, said shaft being rotated by said circulatory displacement motion of said drive ring.

2. An electromechanical motor as claimed in claim 1 wherein each of said drive elements has a piezo actuator for driving that drive element.

3. An electromechanical motor as claimed in claim 1 wherein said drive ring is circular, and wherein said mechanical connections are disposed that said respective linear displacements act radially on said drive ring.

4. An electromechanical motor as claimed in claim 1 wherein said circulatory displacement motion takes place in a motion plane, and wherein said drive elements are disposed relative to each other at an angle of approximately 90° in said motion plane.

5. An electromechanical motor as claimed in claim 1 wherein said circulatory displacement motion takes place in a motion plane, and further comprising at least one further electromechanical drive element and further rigid, non-articulated mechanical connection connecting said further electromechanical drive element to said drive ring, said two electromechanical drive elements and said at least one further electromechanical drive element being disposed relative to each other at equal angles in said motion plane.

6. An electromechanical motor as claimed in claim 1 wherein said drive ring is disposed relative to said drive shaft so that a permanent pressure contact exists between said drive ring and said shaft.

7. An electromechanical motor as claimed in claim 1 further comprising at least two further electromechanical drive elements which respectively produce linear displacements, at least one non-deformable further drive ring; at least two further rigid non-articulated connections respectively connecting said at least two further drive elements to said further drive ring, said at least one further drive ring being caused to execute said circulatory displacement motion with no deformation of said further drive ring by a combination of the linear displacements of said at least two further drive elements, and said shaft being in rolling line contact with each of said drive ring and said at least one further drive ring, said shaft being rotated by the circulatory displacement motions of said drive ring and said at least one further drive ring.

8. An electromechanical motor as claimed in claim 1 wherein said shaft is disposed inside said drive ring.

9. An electromechanical motor as claimed in claim 1 wherein said shaft is disposed outside of said drive ring.

10. An electromechanical motor as claimed in claim 1 further comprising a stationary base plate and a plurality of mounting blocks rigidly attached to said stationary base plate on which said electromechanical drive elements are respectively fixedly mounted.

11. An electromechanical motor as claimed in claim 1 wherein said rigid, non-articulated mechanical connections each comprise a welded connection.

* * * * *